UNITED STATES PATENT OFFICE.

GEORGE D. VAN ARSDALE, OF EAST ORANGE, NEW JERSEY.

PROCESS OF EXTRACTING COPPER FROM ORES.

1,119,478. Specification of Letters Patent. Patented Dec. 1, 1914.

No Drawing. Application filed September 20, 1912. Serial No. 721,429.

*To all whom it may concern:*

Be it known that I, GEORGE D. VAN ARSDALE, a citizen of the United States of America, and a resident of East Orange, county of Essex, New Jersey, have invented a certain new and useful Improvement in Processes of Extracting Copper from Ores, of which the following is a specification.

This invention relates to an improved process of changing the copper in ores into soluble copper compounds, dissolving them and then precipitating the copper from the resultant solution, and its object is to provide a simple and inexpensive method of treatment for these purposes.

According to my improved process the ore after it has been ground to desired fineness is roasted with a suitable material to form copper compounds which are soluble in water. If copper sulfates are desired, the ore may be roasted, with pyrites if there is not enough sulfur in the ore. Or by roasting it with salt, a product is made from which copper chlorids may be obtained. These two methods are known as sulfatizing and chloridizing roasts respectively. These methods have not gone into general use for the following reasons: In most cases it has been impossible to convert a sufficient amount of the copper by such roasting into water-soluble copper compounds so that it has been necessary to add an acid at a prohibitive cost. Then when the copper compounds are in solution, the generally proposed method of precipitating it by iron has proven to be too expensive and in many cases entirely impracticable because of the difficulty of getting a supply of iron at a reasonable cost. Moreover, iron precipitation produces an impure copper which cannot be marketed directly. Regenerative methods of precipitation have their own difficulties among which is the fact that the solutions become foul from repeated use.

All of the aforesaid objections are obviated in the method I have discovered. This method can be applied in various ways, the details of which may be varied to meet special cases by anyone familiar with copper leaching and precipitation without departing from the spirit of this invention. In the following description of one of the ways of carrying out this invention, it is assumed that sulfate solutions are to be used but where the cost of salt is equal to or as low as that of pyrites, chlorids may be preferred.

When the ore is roasted there should be a sufficient amount of pyrites or other source of sulfur to have at least two parts of sulfur to one of copper. An excess of sulfur does no particular harm. During the roasting particular attention should be paid to the temperature and other factors to obtain the maximum amount of copper compounds which are soluble in water. After roasting these compounds are leached out with water which may be acidulated by the addition of a desired amount of liquid from a preceding operation, to dissolve the copper present in the form of sulfates and oxids. At the beginning of the leaching operation, it will of course be necessary to use dilute sulfuric acid to acidulate the wash water but after this acid will be generated for this purpose by the process to be hereinafter set forth. The solution is then withdrawn from the ore as completely as possible and water or weak solution added to the residue of the ore and agitation and leaching repeated, and the wash liquid withdrawn. A part or all of this first wash liquid is added to the first liquor or solution to maintain a desired standard strength and volume of solution for the succeeding steps of the process. The ore which contains the copper which has not been separated by these operations is again subjected to washing with water or weak solution and the resulting second wash liquid passed over iron to recover such copper as may be in it and then with its impurities allowed to run to waste. By properly choosing the amount of solution rejected in this way, the main solutions in the cycle of operations may be kept as free from accumulated impurities as necessary. The first liquor from the ore with the wash solution added to it is now subjected to electrolysis in the presence of sulfur dioxid. The sulfur dioxid may be added to the solution either by absorption in a tower, or it may be added to the solution in the electrolytic vats. The latter method is preferable where a sufficiently strong gas can be had as it serves to agitate and heat the solutions during the electrolysis, both of which are desirable. The amount of sulfur dioxid added may be sufficient to satisfy the equation,—

$$CuSO_4 + SO_2 = Cu + 2H_2SO_4$$

but in many cases it is enough to supply only enough sulfur dioxid to keep the iron salts which are always present, reduced to the ferrous state.

In ordinary electrolysis with an insoluble anode a high voltage is required, but by operating in this manner the voltage may be greatly reduced and the amount of copper precipitated per unit of power is such as to render this method more economical than any other heretofore proposed.

I have discovered and described in an application for Patent Serial No. 697,784 filed by me May 16, 1912, that the electrical conditions may be controlled and stopped before the undesirable sulfur compounds of copper begin to be precipitated. In ordinary working the point at which the electrolysis should be stopped is when eighty per cent. of the copper has been precipitated. After this amount of copper has been thrown down, the remaining solution which contains free acid and the remaining copper is used to dissolve copper from a fresh charge of ore as described.

What I claim is:

A process of extracting copper from its ores comprising roasting the ore with a sulfur compound, leaching out the resulting soluble copper compound, introducing sulfur dioxid and at the same time separating the copper from said solution by electrolysis, controlling the electrolysis to cause the deposition of a large portion of the copper in the form of metallic copper, and stopping the electrolysis before sulfid compounds begin to be precipitated.

In witness whereof, I have hereunto set my hand this 15th day of September in the year 1912.

GEORGE D. VAN ARSDALE.

Witnesses:
J. C. CRAWFORD,
FRED. W. LIDDELL